(12) United States Patent
Park et al.

(10) Patent No.: US 7,976,183 B2
(45) Date of Patent: Jul. 12, 2011

(54) BACKLIGHT UNIT

(75) Inventors: Jung Hong Park, Daegu (KR); Jang Won Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 179 days.

(21) Appl. No.: 12/318,273

(22) Filed: Dec. 23, 2008

(65) Prior Publication Data
US 2009/0273919 A1    Nov. 5, 2009

(30) Foreign Application Priority Data
May 2, 2008    (KR) .................. 10-2008-0041568

(51) Int. Cl.
*F21V 23/02*    (2006.01)

(52) U.S. Cl. ....... 362/221; 362/97.2; 362/225; 362/630; 362/631

(58) Field of Classification Search ........ 362/97.1–97.2, 362/217.11, 221, 225, 234, 253, 630–631; 349/58; 361/784; 439/44–45, 56, 65
See application file for complete search history.

(56) References Cited

U.S. PATENT DOCUMENTS
2008/0143920 A1 *    6/2008    Back et al. ............ 349/58
* cited by examiner

*Primary Examiner* — Stephen F Husar
*Assistant Examiner* — Meghan K Dunwiddie
(74) *Attorney, Agent, or Firm* — Morgan, Lewis & Bockius LLP

(57) ABSTRACT

A backlight unit capable of preventing its mis-operation and the generation of sparks due to electrical connection defects is disclosed. The backlight unit includes: a plurality of lamps emitting lights; a lamp printed-circuit board including a power supply portion electrically connected to the plural lamps and a connector wiper transferring a drive voltage to be applied to the power supply portion; a connector including a connector housing, engaged with the connector wiper and electrically connected to the connector wiper, and wires electrically connected to the connector housing; and another printed-circuit board, electrically connected to the wires, applying the drive voltage to the lamp printed-circuit board. The connector housing includes stoppers extruded toward the lamp printed-circuit board. The stoppers prevent a contact defect of the connector wiper and the lamp printed-circuit board which is caused by the connector housing.

10 Claims, 6 Drawing Sheets

BACKLIGHT UNIT

CROSS-REFERENCE TO RELATED APPLICATION

This application claims priority under 35 U.S.C. 119 to Korean Patent Application No. 10-2008-0041568, filed on May 2, 2008, which is hereby incorporated by reference in its entirety.

BACKGROUND

1. Field of the Disclosure

This disclosure relates to a liquid crystal display device, and more particularly a backlight unit adapted to prevent its mis-operation due to an electrical connection defect.

2. Description of the Related Art

In general, the liquid crystal display device provides futures such as lightness, slimness, low consumption power, and other. Accordingly, the liquid crystal display device has been applied to a variety of fields including personal notebook computers and monitoring appliances.

The liquid crystal display device includes a liquid crystal panel and a backlight unit, which are fixedly received between top and bottom cases combined with each other. The backlight unit applies lights to transmit through the liquid crystal panel. The liquid crystal panel controls the transmittance of the lights and displays an image.

The backlight units are classified into an edge type and a direct type in accordance with the disposition of a light source.

In the edge type backlight unit, the light source is disposed in a position corresponding to a side of the liquid crystal panel. In accordance therewith, the edge type backlight unit is generally applied to small display devices.

On the other hand, the direct type backlight unit includes a plurality of light sources arranged opposite to the rear surface of the liquid panel. The plural light sources directly apply the lights to the rear surface of the liquid crystal panel. Thereupon, the direct type backlight unit has the brightness higher than that of the edge type backlight unit. In view of this point, the direct type backlight unit is mainly applied to large display devices.

Actually, the direct type backlight unit includes a plurality of lamps provided as the light sources, a lamp printed-circuit board (hereinafter, "lamp PCB") electrically connected to the plural lamps to delivery a drive voltage to them, and an inverter PCB applies the drive voltage to the lamp PCB. The lamp and inverter PCBs can be connected to each other through an electrical connection member including connector wiper and housing. In detail, the connector housing is inserted into the connector wiper and is combined with that, thereby electrically connecting the lamp and inverter PCBs to each other. Accordingly, the lamp and inverter PCBs can be electrically connected to each other through an easy assembly process.

However, the connector wiper passes through a hole of the lamp PCB and is soldered on the lamp PCB, so that it is mounted on the lamp PCB with a relatively weak engagement force. Due to this, the connector wiper can break away or come undone from the lamp PCB by an engaging power applied at which the connector wiper is inserted and combined in it. As such, the electrical connection between the lamp and inverter PCBs can break (or can be broken). In the end, the backlight unit can be out of order or can cause the generation of sparks.

BRIEF SUMMARY

Accordingly, the present embodiments are directed to a backlight unit that substantially obviates one or more of problems due to the limitations and disadvantages of the related art.

An object of the present embodiment is to provide a backlight unit capable of preventing its mis-operation due to electrical connection defects.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a plurality of lamps emitting lights; a lamp printed-circuit board including a power supply portion electrically connected to the plural lamps and a connector wiper transferring a drive voltage to be applied to the power supply portion; a connector including a connector housing, engaged with the connector wiper and electrically connected to the connector wiper, and wires electrically connected to the connector housing; and another printed-circuit board, electrically connected to the wires, applying the drive voltage to the lamp printed-circuit board.

Herein the connector housing includes stoppers extruded toward the lamp printed-circuit board. The stoppers prevent a contact defect of the connector wiper and the lamp printed-circuit board which is caused by the connector housing.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings:

FIG. 4 is an enlarged cross sectional view showing the through hole according to the embodiment;

DETAILED DESCRIPTION

Figure 1:
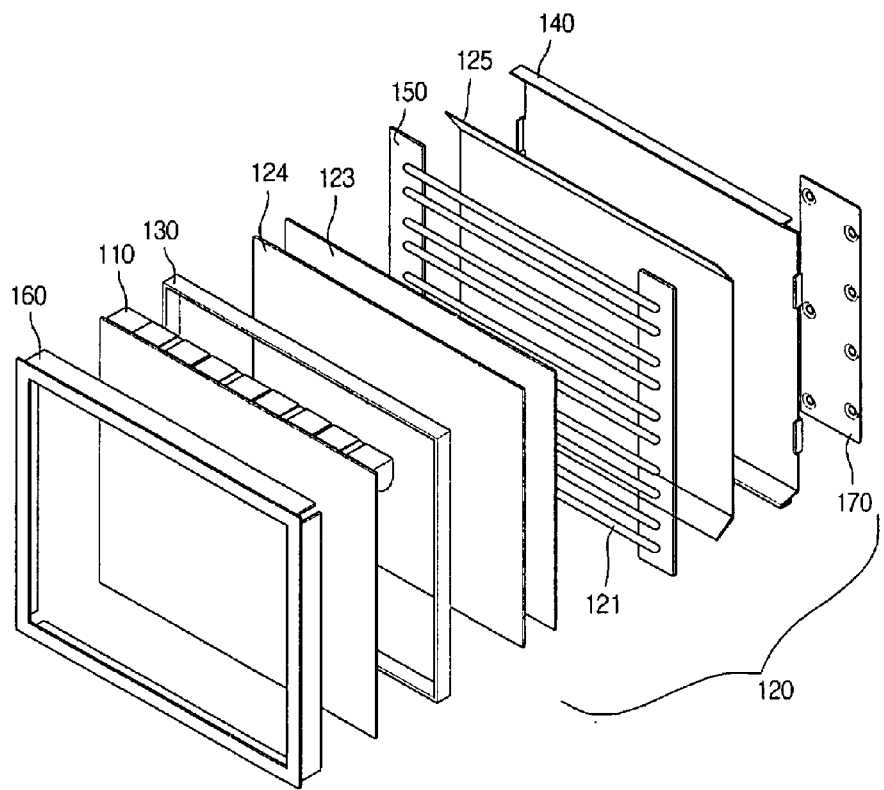
FIG. 1 is a perspective view of liquid crystal display device including a backlight unit according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a perspective view of liquid crystal display device including a backlight unit according to an embodiment of the present disclosure. Referring to FIG. 1, the liquid crystal display device includes a liquid crystal panel 110 displaying an image, a backlight unit 120 applying lights to the liquid crystal panel 110, and a top case 160 covering the side surface portion of the liquid crystal panel 110.

The liquid crystal panel 110 includes an array substrate and a color filter substrate, which are combined with each other in such a manner to be separated from each other by a fixed distance. The array substrate includes a plurality of pixels arranged in a matrix shape, and the color filter substrate includes at least three color filters arranged in the matrix shape. A liquid crystal is interposed between these two substrates. The liquid crystal responds to an electric field and controls a transmittance of lights passing through the liquid crystal panel 110. Also, a gate PCB can be attached to one side of the liquid crystal panel 110 in a tape carrier package system. The gate PCB may be connected to a gate pad portion which is provided on the liquid crystal panel 110 and may apply drive signals. Furthermore, a data PCB (not shown) can be attached to another side of the liquid crystal panel 110 in the tape carrier package system. The data PCB is connected to a data pad portion on the liquid crystal panel 110 and apply data signals.

The backlight unit 120 is disposed on the rear surface of the liquid crystal panel 110 and applies lights to the liquid crystal panel 110. To this end, the backlight unit 120 includes a plurality of lamps 121, a lamp PCB 150 transmitting a drive voltage to the plural lamps 121, a diffusion plate 123 disposed over the plural lamps 121, and a optical sheets 124 on the diffusion plate 123.

The plural lamps 121 may be cold cathode fluorescent lamps (CCFL) or external electrode fluorescent lamps (EEFLs). The CCFL includes internal electrodes which are installed at both ends of a tube. The EEFL includes external electrodes which are installed at both ends of a tube. However, the plural lamps in the present embodiment are not limited to these shapes.

The diffusion plate 123 converts a linear light (i.e., a one-dimensional light) into a flat light (a two-dimensional light). The optical sheets 124 allow the lights to be uniformly entered into the liquid crystal panel 110. To this end, the optical sheets 124 can include a diffusion sheet, a prism sheet, a protective sheet, and so on.

The backlight unit 120 also includes a guide panel 130 substantially receiving the liquid crystal panel 120 and the optical sheet 124. The guide panel 130 prevents the liquid crystal panel 120 from contacting the optical sheet 124.

Moreover, the backlight unit 120 includes a reflective plate 125 disposed below the plural lamps 121. The reflective plate 125 reflects the leaking lights from the plural lamps 121, thereby improving the efficiency of light.

Furthermore, the backlight unit 120 includes a bottom case 140 receiving the plural lamps 121, the lamp PCB 150, and the reflective plate 125. The bottom case 140 can be engaged with the top case 160. The bottom case 140 is not limited to its material, but it can be formed from a material, such as aluminum, having characteristics of light weight and high thermal conductivity.

In the rear surface of the bottom case, another PCB, for example an inverter PCB 170, is disposed. The inverter PCB 170 is electrically connected to the lamp PCB 150 and supplies the lamp PCB 150 with the drive voltage for driving the plural lamps 121. To this end, the inverter PCB 170 may include a transformer and an inverter which are shown in the drawing. The inverter can include first and second switch transistors, first and second snuber capacitors, a reset capacitor, a control circuit, and so on. The transformer transforms a low voltage from the exterior into a high voltage enough for turning on the lamps 121. In other words, the transformer has a function of generating the drive voltage.

The electrical connection between the lamp and inverter PCBs 150 and 170 can be easily performed by connectors 190 and 151, as described below, which are combined with the lamp PCB 150. The combination structure of the connectors will be now explained in detail to refer to the attached drawings.

Figure 2:
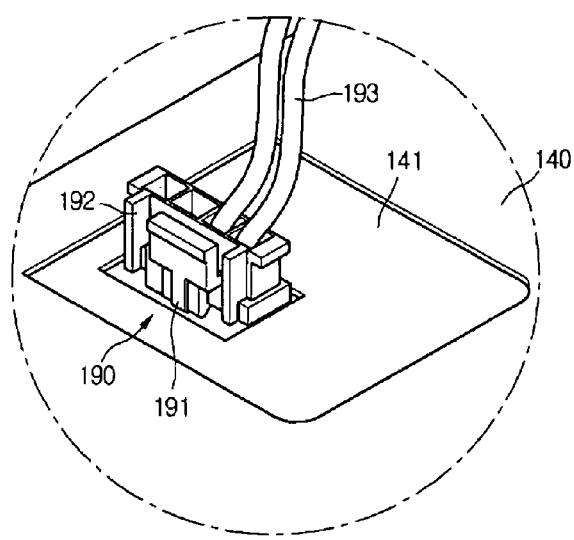
FIG. 2 is a perspective view showing a part of construction on the rear surface of a bottom case which is included in a backlight unit according to an embodiment of the present disclosure.

FIG. 2 is a perspective view showing a part of construction on the rear surface of a bottom case which is included in a backlight unit according to an embodiment of the present disclosure. Referring to FIG. 2, the bottom case 140 has an opening exposing the connector which is connected to the lamp PCB 150. The connector includes a connector housing 190 electrically connected to the lamp PCB 150 and wires 193 electrically connected to the connector housing 190. The wires are electrically connected to the inverter PCB 170 by means of solders, thereby electrically connecting the lamp and inverter PCBs 150 and 170 with each other.

In FIG. 2, a reference number "141," which is not cited in this description, indicates an insulation member for protecting and insulating the lamp PCB 150 from the exterior.

Figure 3:
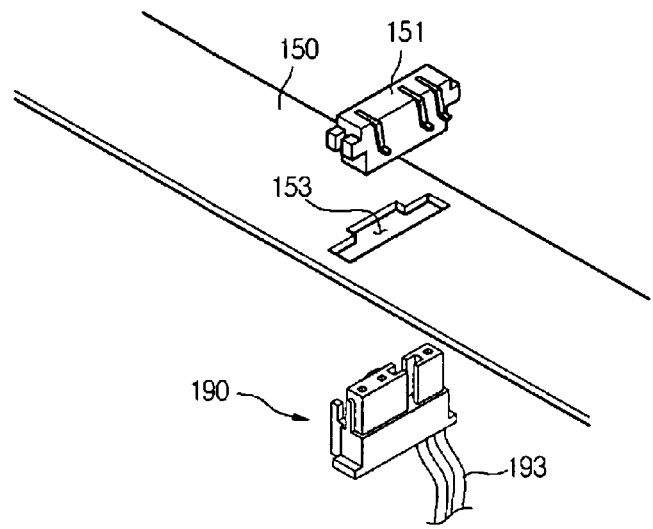
FIG. 3 is a disassembled perspective view explaining the combination structure of a connector according to an first embodiment of the present disclosure.
Figure 4:
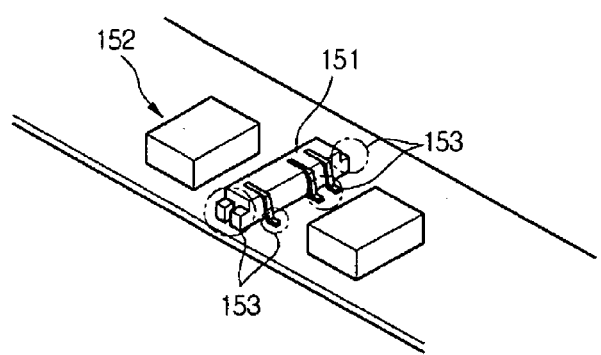
FIG. 4 is a perspective view showing the front surface of a lamp PCB in which a connector according to an embodiment of the present disclosure is combined.
Figure 5:
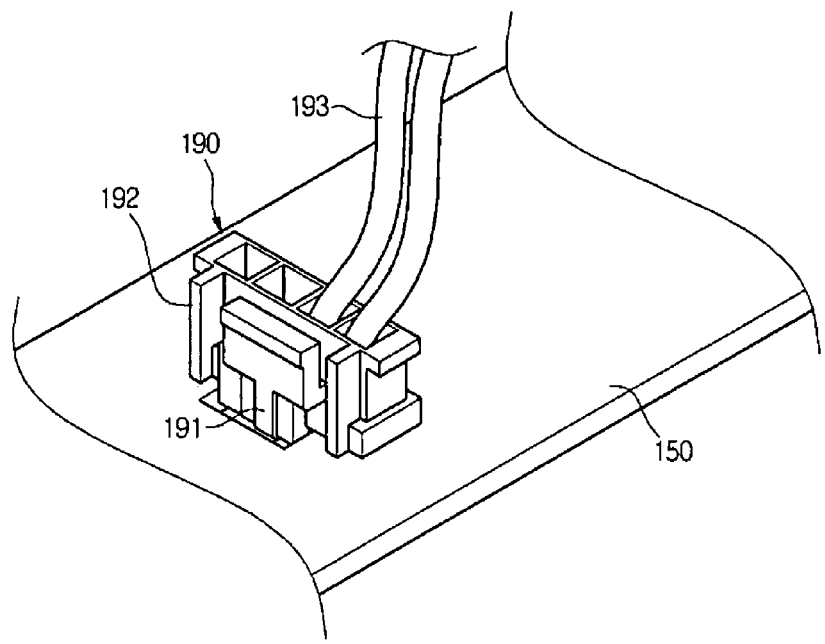
FIG. 5 is a perspective view showing the rear surface of a lamp PCB in which a connector according to an embodiment of the present disclosure is combined.

FIG. 3 is a disassembled perspective view explaining the combination structure of a connector according to an embodiment of the present disclosure. FIG. 4 is a perspective view showing the front surface of a lamp PCB in which a connector according to an embodiment of the present disclosure is combined. FIG. 5 is a perspective view showing the rear surface of a lamp PCB in which a connector according to an embodiment of the present disclosure is combined.

Referring to FIGS. 3 to 5, a power supply portion 152 electrically connected to the plural lamps 121 is disposed on the lamp PCB 150. The power supply portion 152 may be either a socket receiving wires which are electrically connected to the internal electrodes of the cold cathode fluorescent tubes or a gripper holding the external electrodes of the external electrode fluorescent tubes. The power supply portion is shown in the drawings as the socket, but it is not limited to this.

The lamp PCB 150 mounts a connector wiper 151 to be electrically connected to the connector housing 190. The connector wiper 151 can have a recess receiving a part of the connector housing 190. The connector wiper 151 is electrically connected to the power supply portion 152 on the lamp PCB 150. To this end, the connector wiper 151 is partially inserted into a through hole formed in the lamp PCB. Consequently, the connector wiper 151 can receive the drive voltage for the lamps 121 from the connector housing 190 and can apply the received drive voltage to the power supply portion 152.

In order to install the connector wiper, a feeder loads the connector wiper 151 on the lamp PCB 150. Then, the connector wiper 151 is electrically connected with the lamp PCB through a soldering process, thus it is fixed to the lamp PCB 150. Hereby, the connector wiper 151 is mounted on the lamp PCB 150 by a relatively weak engagement force.

Due to this, if an assembly power for combining the connector wiper and housing 151 and 190 is exceedingly applied to the connector housing 190, the connector wiper 151 is pushed and is pulled out of the through hole 153 of the lamp PCB 150 along with the connector housing 190 inserted toward the through hole 153 of the lamp PCB 150. In other words, the connector wiper 151 can break away or come undone from the lamp PCB 150 by an exceedingly engaging power for inserting the connector housing 190 into the connector wiper 151. As a result, the backlight unit can be out of order or the engaging region of the connector housing and wiper 190 and 151 can be burnt.

To address this problem, the connector housing 190 includes a stopper 192 extruded toward the lamp PCB 150. The stopper 192 controls the movement of the connector housing 190 in a direction passing through the lamp PCB 150. Actually, when the exceedingly engaging power is applied to the connector housing 190, the stopper 192 comes in contact with the lamp PCB 150 and is supported by the lamp PCB 150, thereby preventing the insertion of the connector housing 190 into the through hole 153 which receives the connector wiper 151. In accordance therewith, although the exceedingly engaging power is applied to the connector housing 190 to be combined with the connector wiper 151, the pushing force by the connector housing 190 is not transferred to the connector wiper 151. Therefore, the connector wiper 151 is not broken away from the lamp PCB 150.

Figure 6:
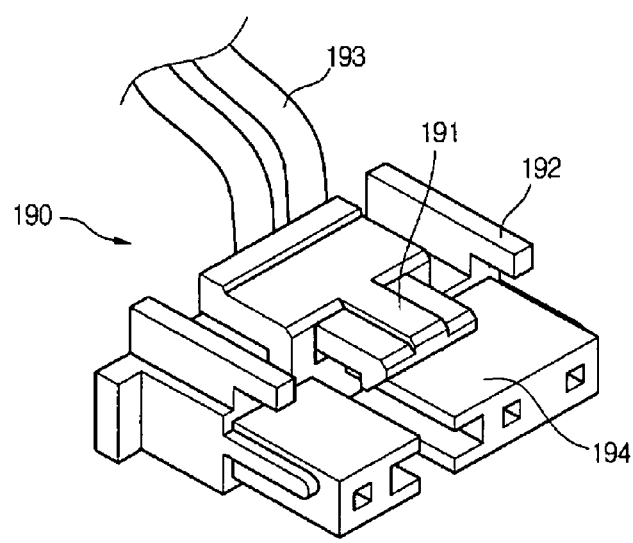
FIG. 6 is an enlarged perspective view showing a connector housing according to an embodiment of the present disclosure.

FIG. 6 is an enlarged perspective view of the connector housing shown in FIG. 3. Referring to FIGS. 5 and 6, the connector housing 190 includes a contact insertion portion 194, an engagement portion 191, and the stoppers 192.

The contact insertion portion 194 is inserted into the connector wiper 151. Also, the contact insertion portion 194 is electrically connected to the wires 193. Moreover, the contact insertion portion 194 includes conduction pins which are electrically connected to the connector wiper 151.

The engagement portion 191 extrudes toward the lamp PCB 150 in parallel with the contact insertion portion 194. Also, the engagement portion 191 may have a hooker shape that its end is bent. This engagement portion 191 is disposed on an outer surface of the connector wiper 151 and its end is hooked in a recess on the outer surface of the connector wiper 151. To this end, the engagement portion 191 has a length shorter that that of the contact insertion portion 194. Therefore, the engagement portion 191 can stably fix the connector housing 190 to the lamp PCB 150.

Preferably, the stoppers 192 are arranged in both sides of the engagement portion 191 so that they can be stably supported by the lamp PCB 150. To this end, the stoppers extrude toward the lamp PCB 150 in parallel with the contact insertion portion 194. If the stoppers 192 are extruded more of the engagement portion 191 (i.e., when they have the length longer than that of the engagement portion 191), they make it difficult to insert the connector housing 190 into the connector wiper 151. Due to this, the stoppers 192 are shortly extruded in comparison with the engagement portion 191. In other words, the stoppers 192 have the lengths shorter than the one of the engagement portion 191.

Such stoppers can be easily formed by a mold modulated from the one for forming the connector housing of the related art. Therefore, the stoppers 192 do not require any additional process because of the simply modulated mold.

Figure 7:
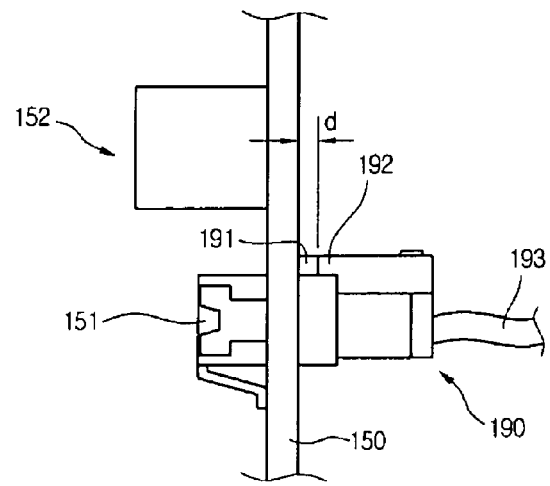
FIG. 7 is a cross sectional view explaining the combination structure of a connector according to an embodiment of the present disclosure.

FIG. 7 is a cross sectional view explaining the combination structure of a connector according to an embodiment of the present disclosure. As shown in FIG. 7, the stoppers 192 are separated from the lamp PCB 150 by a fixed distance, as they have the lengths shorter than that of the engagement portion 191, when the connector housing 190 is stably combined with the connector wiper 151.

If the engaging power for combining the connector housing 190 with the connector wiper 151 is exceedingly applied to the connector housing 190, the stoppers 192 come in contact with the lamp PCB 150 and are mounted to the rear surface of the lamp PCB 150, thereby preventing the movement of the connector housing 190 toward the connector wiper 151. Accordingly, although the exceedingly engaging power is applied to the connector housing 190, the connector wiper 151 does not break away from the lamp PCB 150.

Preferably, such a fixed separation distance "d" between the stopper 192 and the lamp PCB 150 may be a range of about 0.1 mm through 0.3 mm. If the fixed separation distance "d" is below 0.1 mm, the stoppers 192 disturb the hooking of the engagement portion 191, thereby causing the engaging defect of the engagement portion and the connector wiper 151. On the contrary, when the fixed separation distance is above 0.3 mm, the stoppers 192 make it difficult to limit the engaging power of the connector housing 190, so that the connector wiper 151 can break away from the lamp PCB 150.

In this manner, the connector housing 190 includes the stoppers limiting its movement and prevents the breakaway of the connector wiper 151. Therefore, the backlight unit according to the present embodiment can solve the problems on the mis-operation and the generation of sparks, which are caused by the engaging defect of the connector wiper 151 and the connector housing 190. Also, as the stoppers 192 can be formed by the simply modulated mold, the backlight unit does not require any additional process.

As described above, the backlight unit according to an embodiment of the present disclosure controls the movement of the connector housing against the lamp PCB, by means of the stoppers for preventing the contact defect between the connector housing and the connector wiper. The backlight unit can prevent its mis-operation due to the engaging defect between the connector wiper and the connector housing.

Moreover, since the stoppers can be formed by the simply modulated mold, the backlight unit according to the embodiment of the present disclosure does not require any additional process.

It will be apparent to those skilled in the art that various modifications and variations can be made in the present disclosure. Thus, it is intended that the present disclosure cover the modifications and variations of this embodiment provided they come within the scope of the appended claims and their equivalents.

Figure 8A:
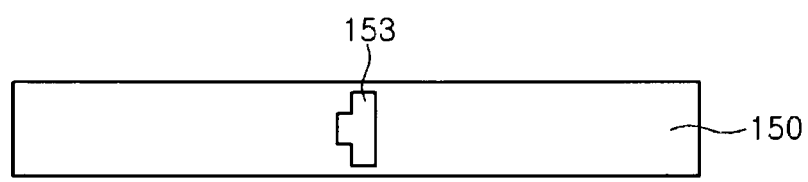
FIG. 8a and FIG. 8b are the through hole
Figure 8B:
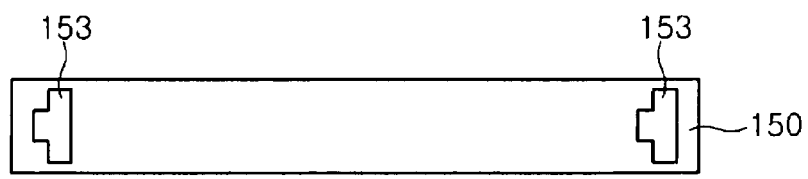

The through hole 153 receiving the connector wiper 151 may be formed in the central portion of the lamp PCB 150 as shown in FIG. 8A. Alternatively, the through hole 153 may be formed in one end portion of the lamp PCB 150 as shown in FIG. 8B.

Figure 9:
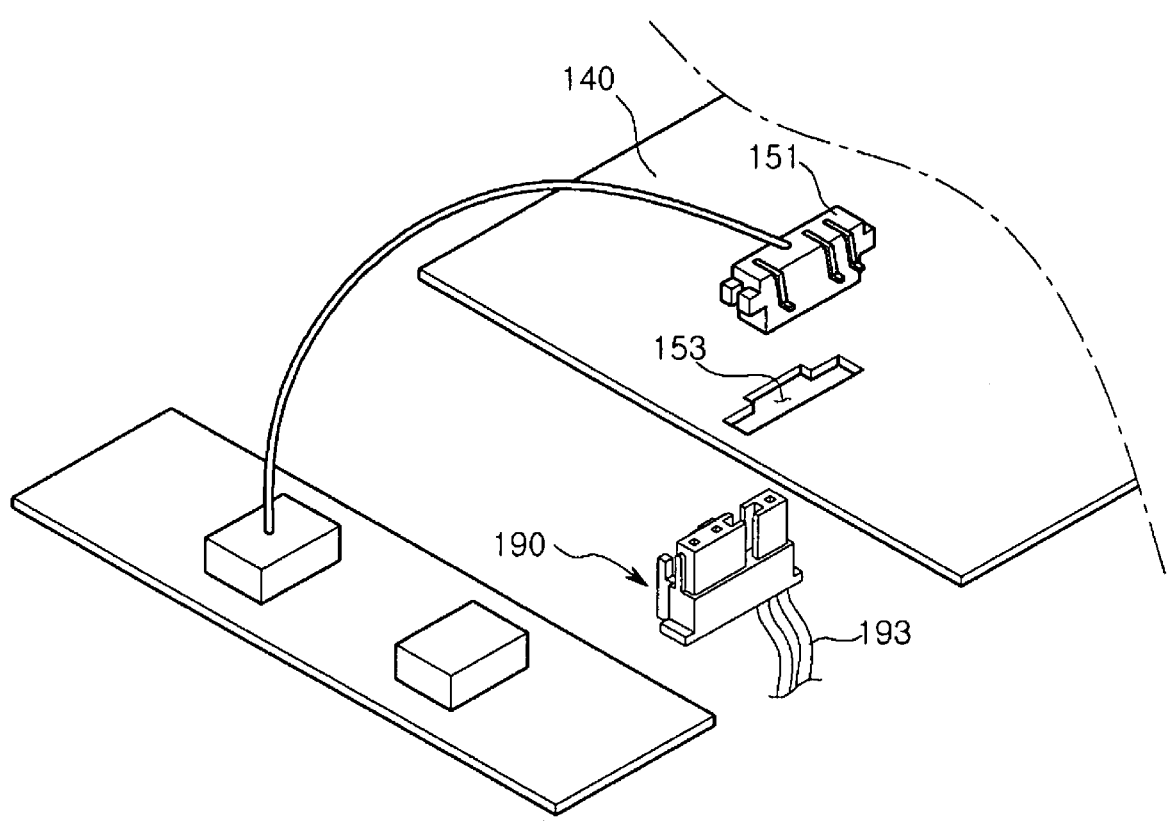
FIG. 9 is a disassembled perspective view explaining the combination structure of a connector according to second embodiment of the present disclosure.
Figure 10:
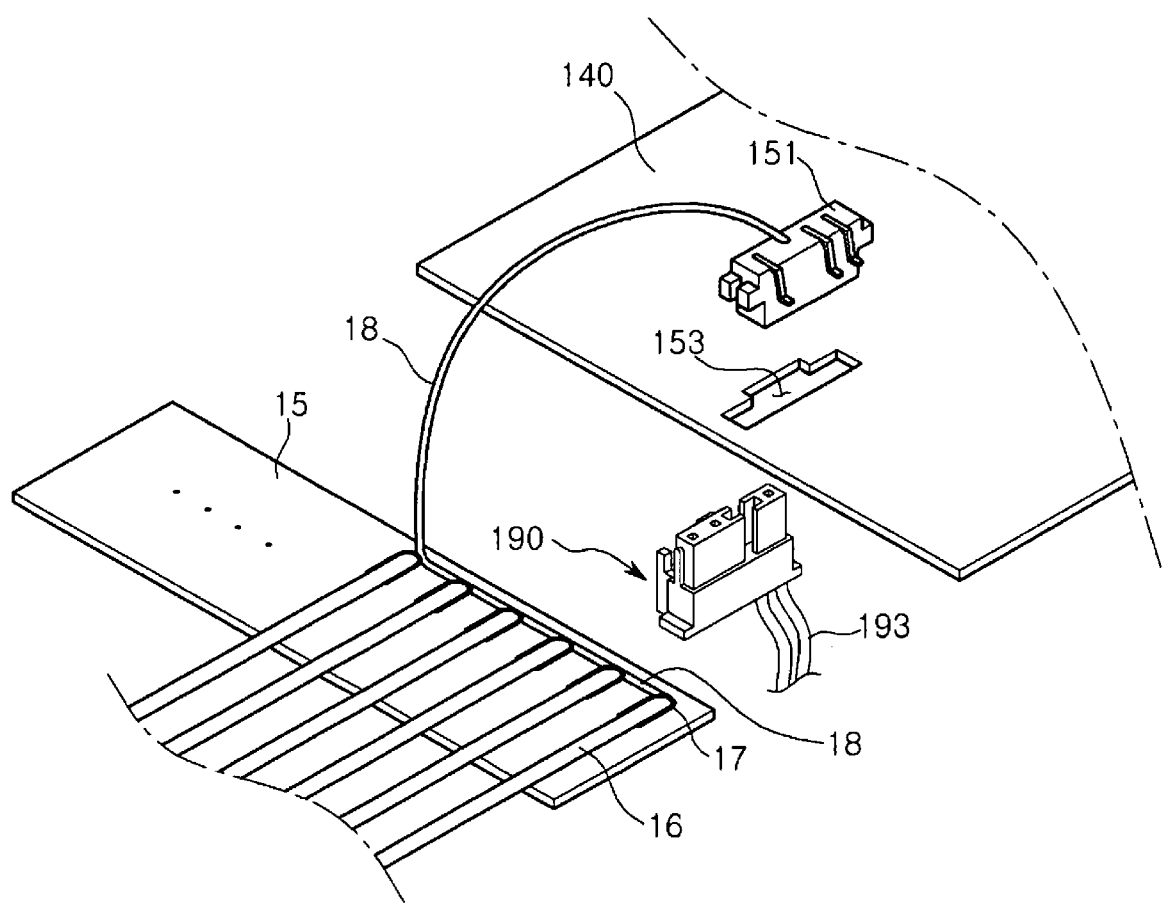
FIG. 10 is a disassembled perspective view explaining the combination structure of a connector according to third embodiment of the present disclosure.

In the difference from the above embodiments of the present disclosure allowing the through hole 153 is formed in the lamp PCB 150, the through hole 153 can be formed in the bottom case shown in FIG. 1. In other words, the bottom case is loaded with the connector wiper 151, as shown in FIG. 9. The connector wiper 151 is partially inserted into the through hole 153, which is formed in the bottom case 140, and is engaged with the connector housing 190 including the stopper 192. The wire 193 of connector housing 190 is electrically connected to the inverter PCB 170. The power supply portion 152 on the lamp PCB 150 is electrically connected to the connector wiper 151 by means of any one of a solder, an electrically conductive adhesive, and an electrically conductive rubber.

The stopper 192 controls the movement of the connector housing 190 in a direction passing through the bottom case 140. In accordance therewith, although the exceedingly engaging power is applied to the connector housing 190 to be combined with the connector wiper 151, the pushing force by the connector housing 190 is not transferred to the connector wiper 151. Therefore, the connector wiper 151 is not broken away from the bottom case 140.

Alternatively, the lamp PCB 150 mounting the power supply portion 152, which is shown in FIG. 9, can be eliminated. In this case, the power supply portion 152 may be replaced with a lamp socket unit 15 directly applying a drive voltage to the plural lamps 121. The lamp socket unit 15 includes: a plurality of sockets 17 electrically connected with each of the lamps 121 and fastening the lamps 121; an electric connection member 18 connected to the sockets 17 and applying the drive voltage to the sockets 17; and a support plate 15 supporting the sockets 17. The socket connection member 18 is electrically connected to the connector wiper 151 which is mounted on the bottom case 140 and receives the drive voltage from the inverter PCB 170 via the wire 193, the connector housing 190, and the connector wiper 151. The connector wiper 151 is partially passed through the through hole 153, which is formed in the bottom case 140, and is engaged with the connector housing 190 including the stopper 192.

What is claimed is:

1. A backlight unit comprising:
   a plurality of lamps emitting lights;
   a lamp printed-circuit board including a power supply portion electrically connected to the plural lamps;
   a connecting wiper inserted into a hole of the lamp printed-circuit board and electrically connected to the power supply portion;
   a connector including a connecting housing inserted into the connecting wiper in the hole of the lamp printed-circuit board to be electrically connected to the connecting wiper, and wires electrically connected to the connecting housing and an inverter printed-circuit board; and
   the inverter printed-circuit board configured to apply a drive voltage to the lamp printed-circuit board,
   wherein the connecting housing includes stoppers extruding toward the lamp printed-circuit board to prevent the movement of the connecting housing toward the connecting wiper when the connecting housing is stably combined with the connecting housing, an engagement portion having a hook to hook up to the connecting wiper, and a contact insertion portion inserted into the connecting wiper.

2. The backlight unit claimed as claim 1, wherein the stopper maintains a fixed distance from the lamp printed-circuit board when the connecting housing is stably combined with the connecting wiper.

3. The backlight unit claimed as claim 1, wherein the fixed distance between the lamp printed-circuit board and the stopper is a range of about 0.1~0.3 mm.

4. The backlight unit claimed as claim 1, wherein the stoppers have lengths shorter than the engagement portion.

5. The backlight unit claimed as claim 1, wherein the stoppers are arranged in both sides of the engagement portion.

6. The backlight unit according to claim 1, wherein the hole could be formed on a center portion of the lamp printed-circuit board or on an edge portion of lamp printed-circuit board.

7. A backlight unit comprising:
   a plurality of lamps emitting light;
   a power supply portion electrically connected with the plural lamps;
   a bottom case receiving the lamps;
   a connector wiper inserted into a hole of the bottom case and electrically connected to the power supply portion;
   a connector including a connector housing inserted into the connector wiper in the hole of the bottom case to be electrically connected to the connector wiper, and wires electrically connected to the connector housing and an inverter printed-circuit board; and
   the inverter printed-circuit board configured to apply a drive voltage to the power supply portion,
   wherein the connector housing includes a stopper protruding toward the bottom case to prevent a contact defect of the connector wiper and the bottom case which is caused by the connector housing, an engagement portion having a hook to hook up to the connecting wiper, and a contact insertion portion inserted into the connecting wiper.

8. The backlight unit claimed as claim 7, wherein the power supply portion includes a lamp socket unit.

9. The backlight unit claimed as claim 8, wherein the lamp socket unit includes:
   a plurality of the socket electrically connected to each of the lamps and fixing each of the lamps;
   an electric connection member connected with the sockets to apply the drive voltage to the sockets; and
   a support plate supporting the sockets.

10. The backlight unit claimed as claim 7, wherein the power supply portion is installed in a lamp printed-circuit board.

* * * * *